(No Model.)

J. B. MABURY.
COFFEE AND TEA POT.

No. 264,721. Patented Sept. 19, 1882.

Witnesses:
E. B. Stocking
Chas. H. Ruoff

Inventor:
James B. Mabury

UNITED STATES PATENT OFFICE.

JAMES B. MABURY, OF CHILLICOTHE, OHIO.

COFFEE OR TEA POT.

SPECIFICATION forming part of Letters Patent No. 264,721, dated September 19, 1882.

Application filed March 7, 1882. (No model.)

*To all whom it may concern:*

Be it known that I, JAMES B. MABURY, a citizen of the United States of America, residing at Chillicothe, in the county of Ross and State of Ohio, have invented certain new and useful Improvements in Coffee or Tea Pots; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to vessels adapted to quickly, economically, and thoroughly extract from tea or coffee infusions thereof by means of a water-receptacle, a coffee or tea pot proper, and an intermediately-located coffee or tea receptacle; and it consists in certain devices and combinations of devices hereinafter described, and specifically set forth in the claims.

Figure 1:
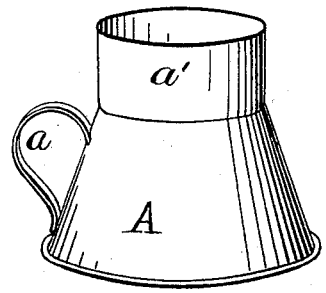
Figure 2:
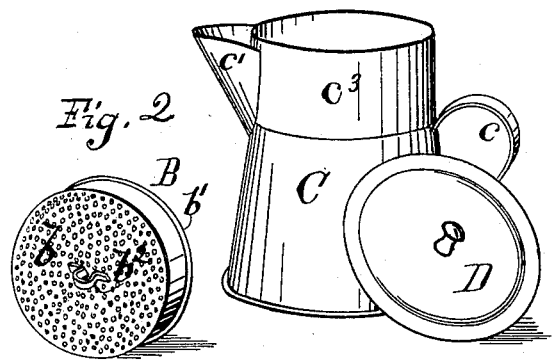
Figure 3:
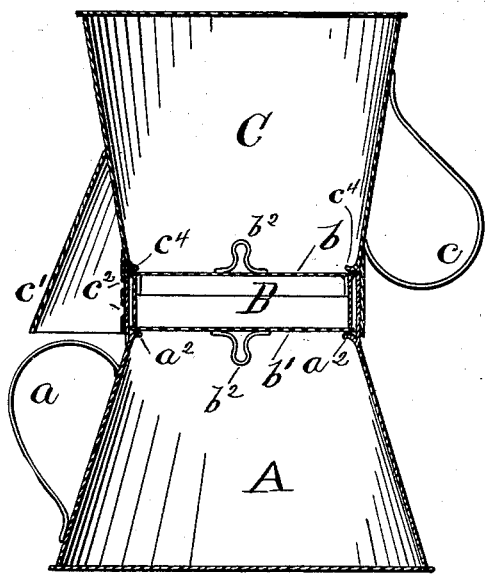

Figure 1 represents the water-receptacle; Fig. 2, the coffee or tea receptacle and coffee or tea pot; Fig. 3, a vertical central section of the several receptacles combined.

Like letters refer to like parts in all the figures.

A represents what is hereinafter denominated the "boiler;" and it consists of any suitably-shaped receptacle in which water can be boiled, and has a handle, $a$, and a deep neck, $a'$, at the bottom of which is an internal flange, $a^2$, which serves as a support for the tea or coffee receptacle B, which is adapted to fit within the neck $a'$ of the boiler. The receptacle B is provided with a perforated top, $b$, and bottom $b'$, each provided with a handle, $b^2$, and imperforate sides, as shown. The top $b$ is provided with a depending flange which enters the receptacle, and serves to render the top top removable as a cover.

The coffee or tea pot proper, C, is fashioned or shaped and constructed similarly to the boiler, and has the usual handle, $c$, delivery-spout $c'$, and strainer $c^2$, while its neck $c^3$ is large enough to receive the neck of the boiler, and its internal flange, $c^4$, broad enough to support or rest upon the receptacle B. An ordinary cover, D, is provided for the pot C.

The manner of using my invention is as follows: Water in quantity equal to that of coffee or tea desired is put into the boiler. The ground coffee or the tea is placed in the receptacle B, and this is inserted in the neck of the boiler and the pot C placed over all and placed upon the stove, where it remains until the water has boiled or is boiling. Then, without separating the parts, the handles are seized and the relative positions of the boiler and pot are reversed, and they are allowed to stand a few minutes, when the boiler and receptacle are lifted from the pot and the cover D is placed thereon and the coffee is ready to be served from the pot.

The operation of my invention is as follows: In heating the water to the boiling-point steam is produced and passes up through the coffee-grounds or the tea in the receptacle, and, partially cooking it, carries with it some of its aroma and strength into the now superimposed and inverted pot, where it is retained in the vapor or condensed by expansion and falls to the receptacle. None of the aroma or strength is allowed to escape, as the perforations of the strainer are practically closed above the flange $c^2$ by the imperforate sides of the receptacle. Upon reversing the parts the hot water is filtered directly through the coffee or tea into the pot, and the resultant liquid partakes fully the strength and aroma, with no considerable amount of the dregs of the coffee or the tea, and thus is quickly accomplished the making of coffee or tea infusions of full strength, with practically the most limited and economical quantity of coffee or tea required.

I do not claim as of my invention a tea or coffee receptacle adapted to be reversed and to indirectly filter the water through the coffee or tea therein contained.

Having described my invention, the manner of using, and the operation of the same, what I claim as new, and desire to secure by Letters Patent, is—

1. An apparatus for making coffee or tea infusions, which comprises a boiler adapted to receive and support a coffee or tea receptacle, a coffee or tea receptacle having imperforate sides and perforated top and bottom, and a coffee-pot adapted to receive, support, and be supported by said boiler and receptacle, whereby the tea or coffee is directly acted upon by steam and directly infiltrated, without exposure to the air, by the water from which the steam is produced, substantially as shown and described.

2. The combination of the boiler A, provided with the flange $a^2$, the receptacle B, having a perforated top and bottom, with a tea or coffee pot, C, provided with the flange $c^2$, substantially as shown and described.

3. The combination of the boiler A, the receptacle B, having perforated top and bottom, and the pot C, substantially as shown and described.

In testimony whereof I affix my signature in presence of two witnesses.

JAMES B. MABURY.

Witnesses:
 JOHN KELLHOFER,
 A. B. HOWSON.